United States Patent
Bett et al.

(10) Patent No.: US 6,855,453 B2
(45) Date of Patent: Feb. 15, 2005

(54) FUEL CELL HAVING A CORROSION RESISTANT AND PROTECTED CATHODE CATALYST LAYER

(75) Inventors: John A. S. Bett, Hamden, CT (US); Ned E. Cipollini, Enfield, CT (US); Thomas D. Jarvi, Manchester, CT (US); Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 96 days.

(21) Appl. No.: 10/331,421

(22) Filed: Dec. 30, 2002

(65) Prior Publication Data

US 2004/0126644 A1 Jul. 1, 2004

(51) Int. Cl.[7] .............................. H01M 4/90; H01M 8/10
(52) U.S. Cl. ............................. 429/42; 429/30; 429/40
(58) Field of Search ............................. 429/40, 44, 30, 429/42

(56) References Cited

U.S. PATENT DOCUMENTS

| | | | | |
|---|---|---|---|---|
| 5,518,839 A | * | 5/1996 | Olsen | 429/304 |
| 6,007,934 A | * | 12/1999 | Auer et al. | 429/44 |
| 6,284,402 B1 | * | 9/2001 | Mallouk et al. | 429/40 |
| 6,432,566 B1 | | 8/2002 | Condit et al. | 429/17 |
| 6,689,505 B1 | * | 2/2004 | Albers et al. | 429/44 |

FOREIGN PATENT DOCUMENTS

WO   WO 00/69009   * 11/2000

OTHER PUBLICATIONS

Ioroi, Kitazawa, Yasuda, Yamamoto and Takenaka; Iridium Oxide/Platinum Electrocatalysts for Unitized Regenerative Polymer Electrolyte Fuel Cells: Journal of the Electrochemical Society; 147, at pp. 2018–2002 (2000).

* cited by examiner

Primary Examiner—Patrick Ryan
Assistant Examiner—Thomas H Parsons
(74) Attorney, Agent, or Firm—Malcolm J. Chisholm, Jr.

(57) ABSTRACT

The invention is a fuel cell (20) having a corrosion resistant and protected cathode catalyst layer (24). The cathode catalyst layer (24) includes a platinum oxygen reduction catalyst and an oxygen evolution catalyst selected from the group consisting of catalysts that are more active than platinum for oxygen evolution. The oxygen evolution catalyst may be uniformly applied within the cathode catalyst layer, or non-uniformly applied to identified high corrosion areas (82) (84) of the cathode catalyst layer (24). The cathode catalyst layer (24) may include heat-treated carbon support material, and/or a heat-treated carbon black within a diffusion layer (40) supporting the cathode catalyst layer (24). The fuel cell (20) may also include an anode catalyst layer (22) having a poor oxygen reduction catalyst having a greater oxygen reduction over potential than platinum.

20 Claims, 4 Drawing Sheets

FUEL CELL HAVING A CORROSION RESISTANT AND PROTECTED CATHODE CATALYST LAYER

TECHNICAL FIELD

The present invention relates to fuel cells that are suited for usage in transportation vehicles, portable power plants, or as stationary power plants, and the invention especially relates to a fuel cell that resists cathode catalyst corrosion upon start up and shut down of the fuel cell.

BACKGROUND ART

Fuel cells are well known and are commonly used to produce electrical energy from hydrogen containing reducing fluid and oxygen containing oxidant reactant streams to power electrical apparatus such as motors, and transportation vehicles, etc. In fuel cells of the prior art, it has been discovered that, upon start up of fuel cells, corrosion takes place on catalyst layers of electrodes, and especially on cathode catalyst layers. That corrosion leads to performance loss of the cathode catalyst layers and the fuel cells.

In starting up known fuel cells that contain air on both anode and cathode catalyst layers and that employ a proton exchange membrane "PEM" as an electrolyte disposed between a cathode and anode catalyst layer, an oxygen containing oxidant is directed to flow through a cathode flow field that directs the oxidant to flow adjacent to the cathode catalyst layer. At about the same time a hydrogen rich reducing fluid fuel stream is directed to flow through an anode flow field that directs the fuel to flow adjacent the anode catalyst layer. As the fuel flows through the anode flow field, a fuel-air front is created moving along the anode catalyst layer until the fuel forces all of the air out of the anode flow field. It has been observed that the catalyst layer that is opposite the fuel-air front experiences substantial corrosion with each start up of a known fuel cell.

For example, FIG. 1 provides a schematic representation of a prior art fuel cell 10 showing chemical reactions that present a known understanding of how corrosion of a cathode catalyst layer 12 takes place. As is common, such a cathode catalyst layer 12 includes a catalyst secured to or integrated with a support material, such as platinum supported on surfaces of a porous carbon black. Upon start up of the fuel cell 10, a hydrogen rich fuel is introduced to an anode catalyst layer 14 in the left-hand side or "Region A" of the cell 10 as shown in FIG. 1, while the opposed cathode catalyst layer 12 is exposed to air. The hydrogen fuel dissociates into hydrogen ions and electrons, and the hydrogen ions pass through the electrolyte 16 from the anode catalyst layer to the cathode catalyst layer 12 within Region A. At the cathode 12, those hydrogen ions participate with electrons in the reduction of oxygen in the air to produce water.

In the right-hand side of FIG. 1, or Region B of the fuel cell 10 as shown in FIG. 1, the air on the anode catalyst layer 14 reacts with the electrons provided from Region A on the anode catalyst layer 14 and with the hydrogen ions or protons supplied from the opposed cathode catalyst layer 12 to form water. Provision of a flow of protons from Region B of the cathode catalyst layer 12 to Region B of the anode catalyst layer 14, and provision of a supply of electrons from Region B of the cathode catalyst layer 12 to Region A of the cathode catalyst layer 12 closes a circuit, raises the potential of the cathode catalyst layer 12 in Region B, and also results in a current reversal from a normal fuel cell operating mode.

The reactions that occur in Region B of the cathode catalyst layer 12, as shown in FIG. 1, are corrosion of carbon to form carbon dioxide and electrolysis of water to form oxygen. The situation depicted in FIG. 1 also occurs when the hydrogen in the fuel stream is completely used. In such a circumstance, oxygen cross-over from the cathode catalyst layer 12 causes a localized "Region B" of FIG. 1 to form with resulting corrosion of the cathode catalyst layer 12 in Region B opposite the fuel starved location.

As is apparent, within Region B, a current reversal is effectively established by the reactions described in FIG. 1 that raises the local potential and rapidly degrades the carbon supporting the catalyst of the cathode catalyst layer 12 that is within Region B, or that is exposed to air and is opposed to an advancing fuel-air front on an anode catalyst layer of a known fuel cell. Examination of used fuel cells that experienced only a few dozen start up and shut down cycles showed that 25% to 30% of a high surface area carbon that supported the cathode catalyst of the cathode catalyst layer had been corroded away.

It is known that purging the anode and cathode flow fields with inert gases immediately upon shut down of the fuel cell passivates the anode and cathode catalyst layers to minimize such oxidative decay. However, use of inert purge gases gives rise to substantially increased complexity and cost of the fuel cell power plant that are undesirable especially in automotive applications where compactness and low cost are critical, and where the system must be shut down and started up frequently. Another solution to the problem of start up corrosion is described in a U.S. Patent Application owned by the assignee of all rights in the present invention, which Application was published on Jun. 20, 2002 under number US-2002-0076582-A1. That solution proposes an extremely rapid purging of the anode flow field upon start up with the hydrogen rich reducing fluid fuel so that air is purged from the anode flow field in no more than one second, or as quickly as no more than 0.05 seconds. It is apparent that the mechanism leading to corrosion of the cathode catalyst layer and especially of the carbon supporting the catalyst layer positioned to be opposite the flow field having the fuel-air front occurs extremely rapidly during fuel cell start up. While known attempts to solve this problem have limited catalyst layer decay, it is still desirable to eliminate or further minimize cathode catalyst layer corrosion upon start up of a fuel cell.

DISCLOSURE OF INVENTION

The invention is a fuel cell having a corrosion resistant and protected cathode catalyst layer. The fuel cell includes an anode catalyst layer and a cathode catalyst layer on opposed surfaces of an electrolyte, wherein the cathode catalyst layer includes a platinum oxygen reduction catalyst, and an oxygen evolution catalyst selected from the group consisting of catalysts that are more active than platinum for oxygen evolution. Exemplary oxygen evolution catalysts that are more active than platinum for oxygen evolution include iridium, rhodium, ruthenium, ruthenium oxide, compounds of ruthenium and titanium oxide, ruthenium and tantalum oxide, ternary compounds of ruthenium, iridium and tantalum oxide, alloys of those materials with platinum, and mixtures thereof.

As shown in FIG. 1, the total anodic current, at a given potential, generated at the cathode catalyst layer 12 within Region B is the sum of the current due to the evolution of oxygen and due to the oxidation of carbon. By utilizing the oxygen evolution catalyst as part of the cathode catalyst layer, the electrolysis of water reaction evolving oxygen will occur at a lower potential so that current resulting from oxygen evolution will be increased, and therefore current resulting from oxidation of the carbon support of the cathode catalyst layer will be decreased, leading to a decrease in corrosion of the cathode catalyst layer 12.

In a preferred embodiment of the fuel cell having a corrosion resistant and protected cathode catalyst layer, the platinum oxygen reduction catalyst is between 4 (four) percent by weight (hereafter "wt. %") and 40 (forty) wt. %, and the oxygen evolution catalyst is between 1 (one) wt. % and 10 (ten) wt. %. The described percentages by weight of the platinum oxygen reduction catalyst and oxygen evolution catalyst are expressed with respect to those catalysts and a carbon support material supporting the catalysts.

In a further preferred embodiment, the cathode catalyst layer defines a reactive surface secured adjacent to an electrolyte wherein the platinum oxygen reduction catalyst is, uniformly applied across the reactive surface of the cathode catalyst layer and the oxygen evolution catalyst is non-uniformly applied across the reactive surface of the cathode catalyst layer. High corrosion areas of the reactive surface of the cathode catalyst layer receive the oxygen evolution catalyst, or they receive a higher proportion of the oxygen evolution catalyst than low corrosion areas of the reactive surface of the cathode catalyst layer. It has been discovered that specific areas of a cathode catalyst layer reactive surface corrode more rapidly than other areas, and such high corrosion areas frequently result from design aspects of flow paths of a reducing fluid stream passing adjacent an opposed fuel flow path. Some areas of a reactive surface of the anode catalyst layer have inadequate hydrogen concentrations to support an average current density of the anode catalyst layer resulting in corrosion of the cathode catalyst layer opposite the area of inadequate hydrogen on the anode catalyst layer. Application of the oxygen evolution catalyst to such high corrosion areas of the reactive surface of the cathode catalyst layer will minimize corrosion in those areas.

In an additional preferred embodiment carbon support materials, such as an amorphous high surface area carbon black that supports the cathode catalysts, and/or an amorphous carbon support layer secured adjacent to the cathode catalyst may be replaced by a heat-treated carbon that resists electrochemical oxidation thereby further minimizing corrosibn of the cathode catalyst layer.

In another preferred embodiment of a fuel cell having a corrosion resistant and protected cathode catalyst layer, the anode catalyst layer includes a catalyst that inhibits an oxygen reduction reaction at the anode catalyst layer, such as in Region B of FIG. 1, during start up of the fuel cell or under oxidizing conditions. The poor oxygen reduction catalyst therefore reduces a total current in Region B, minimizing corrosion there compared to an anode catalyst layer consisting of only a platinum catalyst. Appropriate oxygen reduction catalysts may be in the form of a metal black or may be supported on a suitable support material known in the fuel cell art such as carbon black. The oxygen reduction catalysts may be a pure material, an alloy of two or more materials, or an admixture of two or more materials. Exemplary oxygen reduction catalysts include iridium, rhodium, palladium, rhenium, ruthenium, gold, silver, nickel, alloys of these materials with each other or with platinum, and mixtures thereof.

Use of the described embodiments alone or in combination will result in a fuel cell having a cathode catalyst layer with significantly enhanced corrosion resistance. Accordingly, it is a general purpose of the present invention to provide a fuel cell having a corrosion resistant and protected cathode catalyst layer that overcomes deficiencies of the prior art.

It is a more specific purpose to provide a fuel cell having a corrosion resistant and protected cathode catalyst layer that does not require fuel cell support systems to enhance corrosion resistance of the cathode catalyst layer.

These and other purposes and advantages of the present fuel cell having a corrosion resistant and protected cathode catalyst layer will become more readily apparent when the following description is read in conjunction with the accompanying drawings.

DESCRIPTION OF THE PREFERRED EMBODIMENTS

Figure 2:
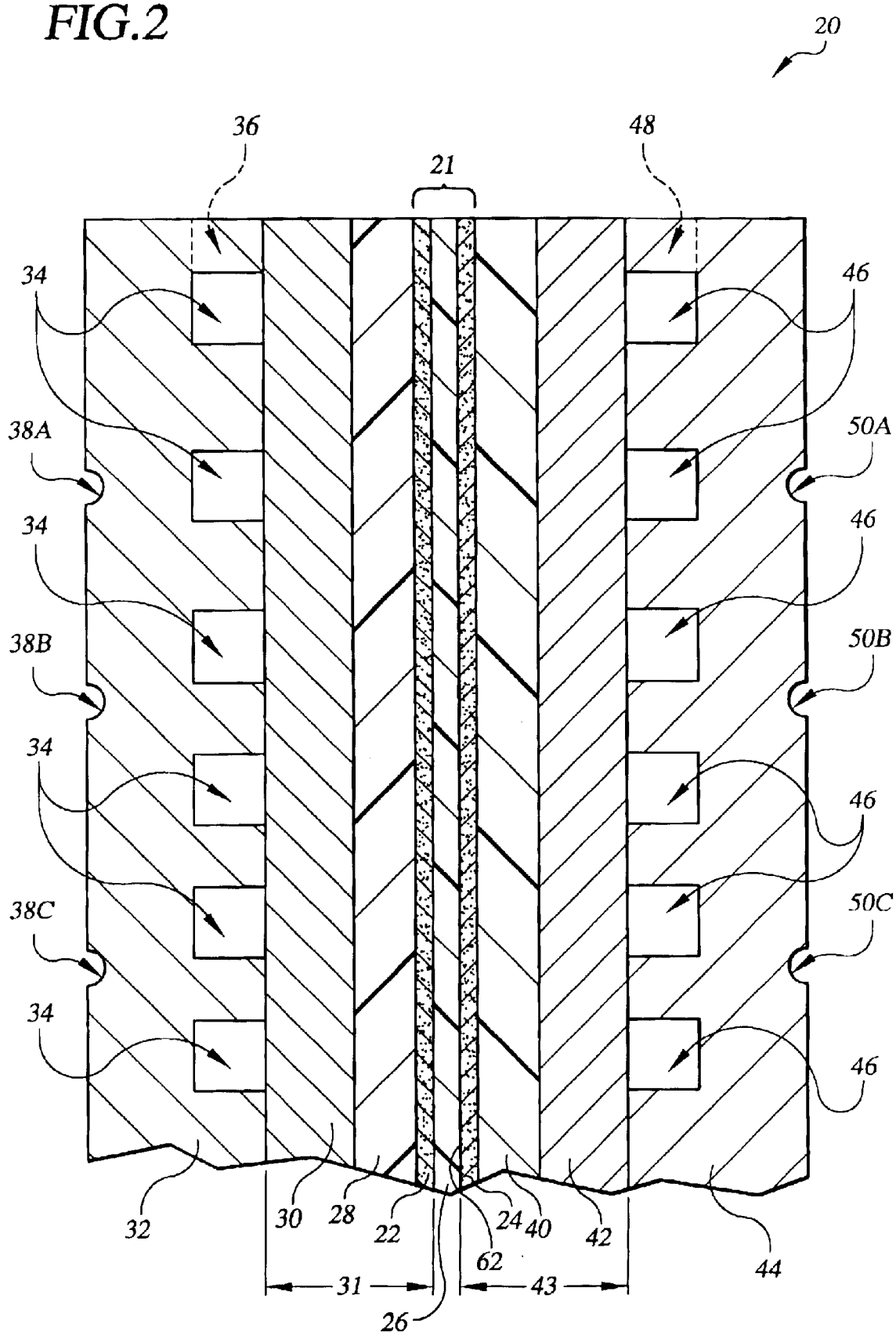
FIG. 2 is a fragmentary, cross-section of a fuel cell having a corrosion resistant and protected cathode catalyst layer constructed in accordance with the present invention.

Referring to the drawings in detail, a fuel cell having a corrosion resistant and protected cathode catalyst layer is shown schematically in cross-section in FIG. 2, and is generally represented by the reference numeral 20. The fuel cell 20 includes a membrane electrode assembly 21 consisting of an anode catalyst layer 22 a cathode catalyst layer 24 secured to opposed sides of an electrolyte 26. The fuel cell 20 may also include an anode catalyst layer support means, consisting of one or more porous layers for supporting the anode catalyst layer 22 and for permitting fluid flow through the anode support means. The one or more porous layers of the anode catalyst layer support means may include an anode diffusion layer 28 secured adjacent to the anode catalyst layer 22 and an anode substrate layer 30 secured adjacent to the anode diffusion layer 28. The anode catalyst layer 22, anode diffusion layer 28 and anode substrate 30 may also be characterized as an anode electrode 31.

An anode water transport plate, bi-polar plate, or cooler plate 32 may also be secured adjacent to the anode catalyst layer support means such as adjacent to the anode substrate layer 30. The anode water transport plate 32 is secured in fluid communication with a known thermal management system (not shown) for directing a coolant stream to flow through the anode water transport plate to remove heat from the fuel cell 20, and to possibly also remove product water from the fuel cell 20, to be directed from the fuel cell 20, and through the thermal management system to be cooled and recycled back through the anode water transport plate 32 in a manner well known in the art, such as shown in U.S. Pat. No. 6,432,566 that issued on Aug. 13, 2002, and is owned by the assignee of all rights in the present invention.

The anode water transport plate 32 may also define a plurality of fuel flow channels 34 for directing a hydrogen rich reducing fluid reactant stream from a fuel inlet 36 to flow adjacent the anode substrate layer 30. It is pointed out that the fuel flow channels 34, and pore space within the anode substrate 30 and anode diffusion layers 28 cooperate to define an anode flow field for directing-the reducing fluid fuel to pass through the fuel cell 20 adjacent to the anode catalyst layer 22. The fuel cell 20 however may include alternative flow fields that consist of cavities, differing channels or grooves, etc, as is known in the art. The anode water transport plate 32 may also define a plurality of anode coolant feed channels 38A, 38, 38C that direct a coolant stream to pass into the porous anode water transport plate 32.

The fuel cell 20 shown in FIG. 2 also includes a cathode catalyst layer support means consisting of one or more porous layers, such as a cathode diffusion layer 40 secured adjacent to the cathode catalyst layer 24, and a cathode substrate layer 42 secured adjacent to the cathode diffusion layer 40 for supporting the cathode catalyst layer 24 and for permitting fluid flow through the cathode support means. The cathode catalyst layer 24, cathode diffusion layer 40 and cathode substrate 42 may be characterized as a cathode electrode 43.

A cathode water transport or cooler plate 44 may be secured adjacent to the cathode catalyst layer support means, which cathode water transport plate 44 may define a plurality of oxidant flow channels 46 in fluid communication with an oxidant inlet 48 for directing an oxygen containing oxidant reactant stream to flow adjacent to the cathode substrate layer 42. The cathode water transport plate 44 may also define a plurality of cathode coolant feed channels 50A, 50B, 50C for directing the coolant stream to flow into and through the cathode water transport plate 44. As with the anode water transport plate 32, the oxidant flow channels 46, and pores within the cathode substrate layer 42 and cathode diffusion layer 40 may serve to define a cathode flow field, however the cathode flow field may also be defined by alternate cavities, channels, etc., as is known in the art. The membrane electrode assembly 21, anode diffusion layer 28, anode substrate layer 30, anode water transport plate 32, cathode diffusion layer 40, cathode substrate layer 42 and cathode water transport plate 44 may be constructed of materials known in the art, such as described in the aforesaid U.S. Pat. No. 6,432,566.

The cathode catalyst layer 24 includes a platinum oxygen reduction catalyst and an oxygen evolution catalyst selected from the group consisting of catalysts more active than platinum for oxygen evolution. Exemplary catalysts that are more active than platinum for oxygen evolution include iridium, rhodium, ruthenium, ruthenium oxide, compounds of ruthenium and titanium oxide, ruthenium and tantalum oxide, ternary compounds of ruthenium, iridium and tantalum oxide, alloys of those materials with platinum, and mixtures thereof. The cathode catalyst layer 24 typically consists of a catalyst secured to a support material, such as a carbon black, wherein the platinum oxygen reduction catalyst and oxygen evolution catalyst are secured to the support material by methods known in the art.

The oxygen evolution catalyst may be present as a layer adjacent the electrolyte 26 while the oxygen reduction catalyst may be present as a layer between the oxygen evolution catalyst and the cathode diffusion layer 40. The oxygen evolution catalyst may also be a physical admixture with the platinum oxygen reduction catalyst on the support material, or the oxygen evolution catalyst may be an alloy with the platinum oxygen reduction catalyst, wherein the alloy is secured to the support material. Additionally, the oxygen evolution catalyst may also be a metal black that is mixed with the supported oxygen reduction catalyst. In a preferred embodiment, the platinum oxygen reduction catalyst is between 4 (four) percent by weight (hereafter "wt. %") and 40 (forty) wt. %, and the oxygen evolution catalyst is between 1 (one) wt. % and 10 (ten) wt. %. The described percentages by weight of the platinum oxygen reduction catalyst and oxygen evolution catalyst are expressed with respect to the platinum oxygen reduction and oxygen evolution catalysts and the carbon support material supporting the catalysts.

Figure 3:
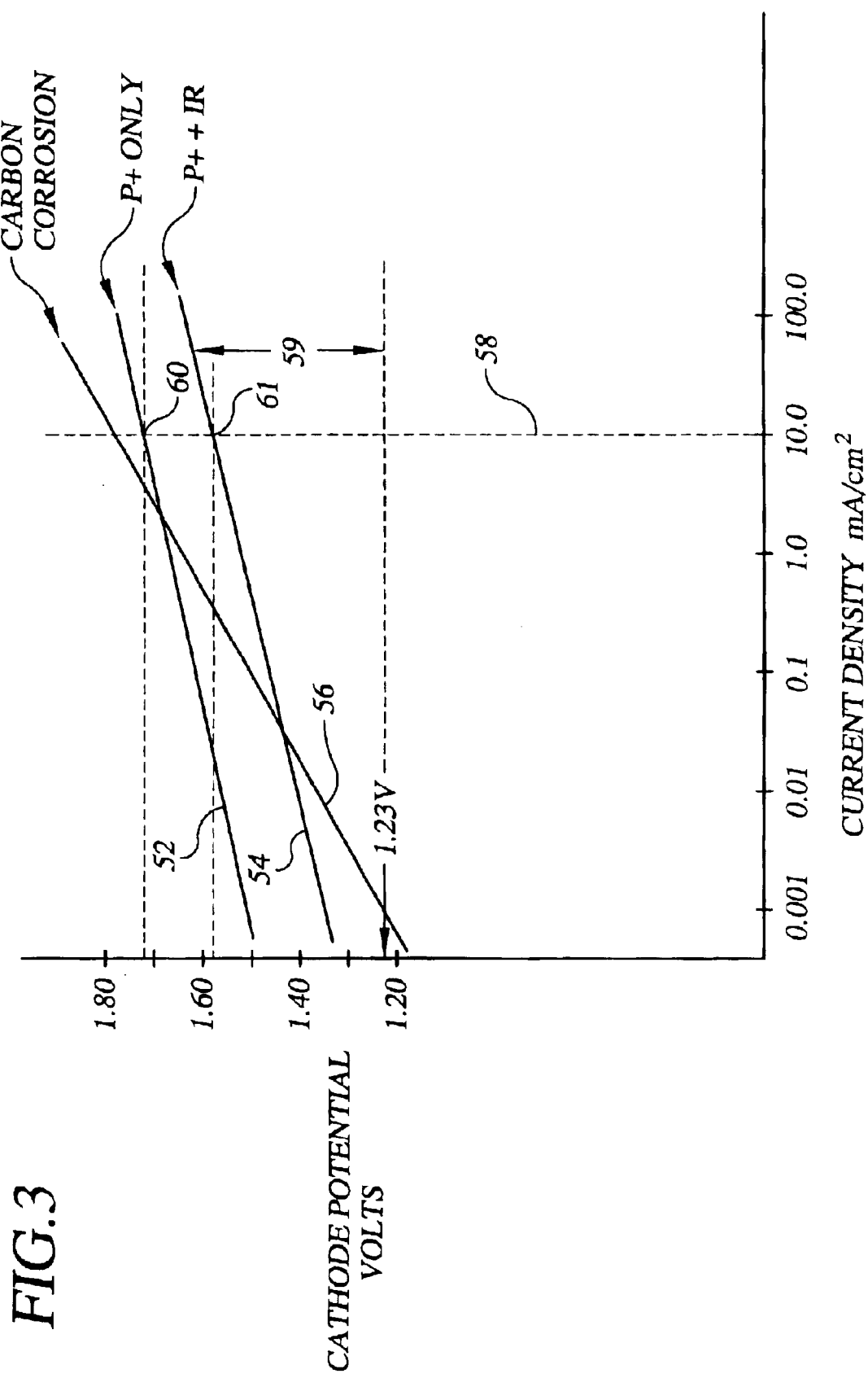
FIG. 3 is a graph showing a plot of cathode potentials and current densities for cathode catalysts and a cathode carbon support material.

Simulations undertaken by the inventors herein endeavored to compare potential and current characteristics for a cathode catalyst layer having a platinum catalyst; having a platinum plus iridium catalyst; and, for a carbon catalyst support. Results of the simulations are plotted in the graph shown in FIG. 3. Line 52 shows the potential versus current characteristics for oxygen evolution of a platinum only catalyst layer containing 0.4 milligrams per square centimeter (hereafter "$mg/cm^2$") of platinum. Line 54 shows the potential versus current characteristics for oxygen evolution of a platinum plus iridium catalyst layer, wherein the relative proportions of the platinum and iridium are 0.4 $mg/cm^2$ of platinum and 0.04 $mg/cm^2$ of iridium. Line 56 shows the potential versus current characteristics for corrosion of a carbon support material, such as carbon black, that supports the catalyst of a cathode catalyst layer. Line 58 shows a local current that occurs on the cathode catalyst layer 24 during a period that the above-described reverse current occurs during a start up of the fuel cell 20. Over potential for oxygen evolution is defined as the actual potential subtracted from the equilibrium potential for the reaction. Line 59 shows the over potential for the platinum plus iridium catalyst versus the potential for the electrolysis of water. A catalyst that is more active for oxygen evolution than platinum will have a lower over potential than platinum compared at the same current density.

Figure 1:
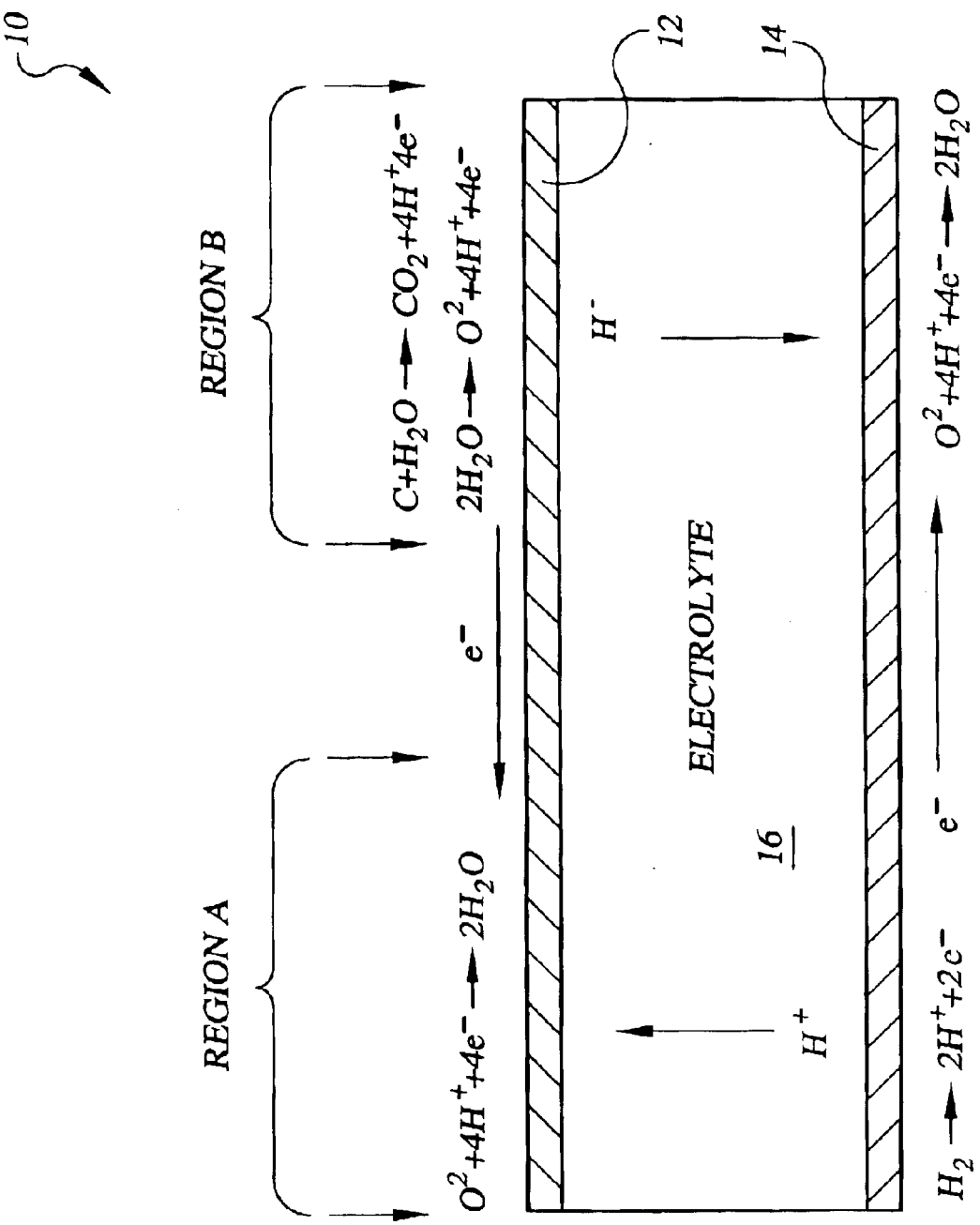
FIG. 1 is a schematic representation of a prior art fuel cell showing chemical reactions that present a known understanding of how corrosion of a cathode catalyst layer takes place.

The total anodic current between the anode catalyst layer 14 and cathode catalyst layer 12 in Region B of FIG. 1, at a given potential, is the sum of the current resulting from the oxygen evolution and the current resulting from the carbon corrosion by way of the reactions shown in FIG. 1. One skilled in the art can construct a composite polarization curve by summing the platinum only line 52 and the carbon only line 56, and summing the platinum and iridium line 54 and carbon only line 56 of FIG. 3. Data reported by T. Iroi et al. in the JOURNAL OF THE ELECTROCHEMICAL SOCIETY, 147, (2000), 2018 may be used to estimate the values of the oxygen evolution currents in FIG. 3.

To appreciate the ameliorating effect of the oxygen evolution catalyst on corrosion of the carbon support of a cathode catalyst layer, it is instructive to examine a case where current reversal at start up has resulted in the requirement for an anodic current of 10 milliamps per square centimeter (hereafter "$mA/cm^2$"). In an exemplary catalyst layer of the prior art, platinum comprises 50 wt. % of the catalyst, the remainder being carbon support, and the platinum is present at a loading of 0.4 $mg/cm^2$. The activity of this catalyst layer for oxygen evolution is such that it will deliver 10 $mA/cm^2$ of anodic current at 1.73 volts (hereafter "V"), as shown at reference numeral 60 in FIG. 3. This catalyst layer will produce an anodic current of about 10 $mA/cm^2$ at a voltage of about 1.70 V, and the current supplied by the oxygen evolution on the platinum is 6 $mA/cm^2$, while the current supplied by corrosion of the carbon support is 4 $mA/cm^2$, to make the total anodic current of 10 $mA/cm^2$.

In an exemplary catalyst layer of the present invention, the catalyst layer includes platinum plus iridium which comprises 50 wt. % of the catalyst layer, the remainder being the carbon support. The platinum is present at a loading of 0.4 mg/cm$^2$ and the iridium is present at a loading of 0.04 mg/cm$^2$. The activity of this catalyst layer for oxygen evolution is such that it will deliver 10 mA/cm$^2$ of anodic current at 1.58 V as shown at reference numeral 61 in FIG. 3. This catalyst layer will produce an anodic current of about 10 mA/cm$^2$ at a voltage of 1.57 V with the current supplied by the oxygen evolution on the iridium being 9.5 mA/cm$^2$, and the current being supplied by the corrosion of the carbon support is 0.5 mA/cm$^2$ to make the total current of 10 mA/cm$^2$. Therefore, the addition of the iridium as an oxygen evolution catalyst with the platinum oxygen reduction catalyst reduces a carbon corrosion rate by a factor of about 8.

In a first preferred embodiment of the fuel cell 20 having a corrosion resistant cathode catalyst layer 24, the cathode catalyst layer 24 defines a reactive surface 62 (shown in FIG. 2) secured adjacent to the electrolyte 26, wherein the platinum oxygen reduction catalyst is uniformly applied across the reactive surface 62 of the cathode catalyst layer 24 and the oxygen evolution is non-uniformly applied across the reactive surface 62 of the catalyst layer 24. The phrase "reactive surface", is not meant to define only the surface of the cathode catalyst layer 24 in contact with the electrolyte 26, but is meant to define a total of all of the catalyst layer surfaces and volume that support electrochemical activity. It has been discovered that specific, identifiable areas of the cathode catalyst layer 24 reactive surface 62 corrode at higher rates than other areas. For purposes of consistency, such areas are referred to herein as "high corrosion areas of the reactive surface of the cathode catalyst layer." By the phrase "the oxygen evolution catalyst is non-uniformly applied across the reactive surface of the cathode catalyst layer", it is meant that the oxygen evolution catalyst may be applied in greater quantities to the identified high corrosion areas, or that the oxygen evolution catalyst may be applied only to the identified high corrosion areas.

Figure 4:
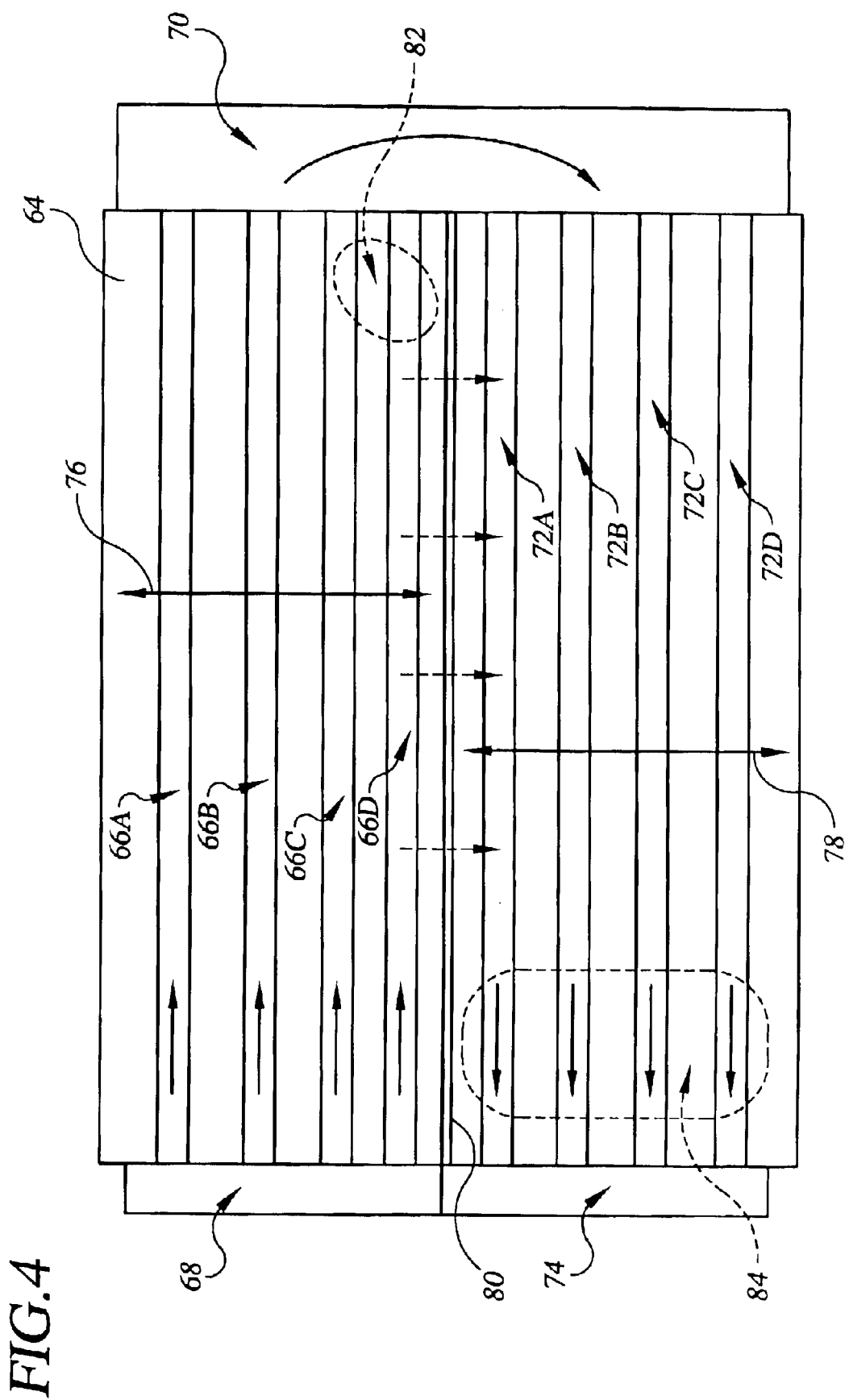
FIG. 4 is a schematic, plan view of an anode water transport plate, showing a fuel inlet, outlet, fuel turn around and channels directing flow of a reducing fluid fuel through a fuel cell.

The areas of high corrosion of the cathode catalyst layer 24 are thought to result primarily from design aspects of flow paths of the reducing fluid fuel reactant stream passing through the fuel cell 20. FIG. 4 shows an exemplary anode water transport plate 64 that defines a plurality of first pass fuel channels 66A, 66B, 66C, 66D that direct a fuel stream to flow from a fuel inlet manifold 68 to a fuel turn around manifold 70. The anode water transport plate 64 also defines a plurality of second pass fuel channels 72A, 72B, 72C, 72D that direct the fuel stream (represented by arrows within the first and second pass fuel channels) to flow from the fuel turn around manifold to a fuel outlet manifold 74. A first pass of the fuel stream is therefore represented by the arrow 76, and a second pass of the fuel stream is represented by the arrow 78. Typically the first pass 76 is separated from the second pass 78 by a barrier wall 80 to restrict direct passage of the fuel stream from the first pass 76 to the second pass 78 without going through the fuel turn around manifold 70. However, as noted above with reference to FIG. 2, the exemplary anode water transport plate 64 may be secured adjacent to a porous anode support means, and some of the fuel stream may pass through the adjacent porous support means, such as the porous anode substrate layer 30 and diffusion layer 28, from the first pass 76 into the second pass 78, as represented by the hatched lines in FIG. 4 passing through the barrier wall 80. Differentials in pressure of the fuel stream within the first and second passes 76, 78 may cause such migration of the fuel stream from the first pass 76 to the second pass 78.

In such circumstances, a high corrosion area of a cathode catalyst layer, such as the cathode catalyst layer 24, secured to an opposed surface an electrolyte adjacent to the exemplary anode water transport plate 64, may form in the cathode catalyst layer opposite to the area in the anode water transport plate 64 where the fuel flow channels 66C and 66D are closest to the barrier wall 80 and enter the fuel turn around manifold 70. Such a first high corrosion area is represented in FIG. 4 by the hatched enclosure 82. Within the area of the anode flow field 64 opposed to the first high corrosion area 82, because of flow of the fuel stream around the barrier wall 80, the fuel stream may have inadequate hydrogen concentrations to support an average current density of an adjacent anode catalyst layer, such as the anode catalyst layer 22 of FIG. 2. That results in the first high corrosion 82 area going to an elevated potential which produces corrosion within the first high corrosion area 82.

Additionally, as the fuel stream approaches the fuel outlet manifold 74 within the second pass fuel channels 72A, 72B, 72C, 72D, because of, for example, shallow fuel channels due to manufacturing tolerances and other reasons, the fuel stream may not have adequate hydrogen to support the average current density of the adjacent anode catalyst layer. This results in a second high corrosion area designated by the hatched enclosure 84 in FIG. 4 on the opposed cathode catalyst layer, such as the cathode catalyst layer 24 shown in FIG. 2.

As is apparent, high corrosion areas of a cathode catalyst layer are therefore largely a function of design features of a given fuel cell and may vary considerably from cell to cell. For example, it is common to have multiple fuel passes, and to sometimes use a fluid sealed wall between passes to restrict any migration of fuel streams between passes. The oxygen evolution catalyst is preferably applied opposite to the areas on the anode catalyst layer 22 subject to localized fuel depletion. Therefore, characterization of a location of high corrosion areas of a cathode catalyst layer for purposes herein must be described as identified high corrosion areas, rather than a specific area of a particular fuel cell. For example, instead of describing a high corrosion area as being "adjacent a fuel outlet" or "adjacent a fuel pass wall", the first preferred embodiment of the fuel cell 20 having a corrosion resistant and protected cathode catalyst layer 24 will describe non-uniform distribution of the oxygen evolution catalyst on the reactive surface of the catalyst layer so that the oxygen evolution catalyst is applied to identified high corrosion areas of the reactive surface 62 of the cathode catalyst layer 24, or is applied to identified high corrosion areas of the reactive surface 62 of the cathode catalyst layer 24 at a greater quantity than the oxygen evolution catalyst is applied to non-high corrosion areas of the reactive surface 62 of the cathode catalyst layer 24. By the phrase "at a greater quantity", it is meant that more oxygen evolution catalyst is applied to the identified high corrosion areas than is applied to non-high corrosion areas.

In a second preferred embodiment of the fuel cell 20 having a corrosion resistant and protected cathode catalyst layer 24, the cathode catalyst layer 24 includes a carbon support that has been heat-treated. Additionally, the carbon support in the cathode support layer adjacent to the cathode catalyst layer 24, such as the porous cathode diffusion layer 40, may also be heat-treated. Heat-treating the carbon black support for the cathode catalysts and/or the carbon black in the cathode diffusion layer 40 significantly reduces a corrosion rate of the heat-treated carbon. It has been discovered that a heat-treated carbon support material of the cathode catalyst layer 24 or a heat-treated carbon diffusion layer 40 will corrode at a rate that is about two orders of magnitude slower than an amorphous carbon support material or layer. It is currently estimated that 50% of the amorphous carbon support material corrodes through 200 start up-shut down cycles in a known fuel cell using a proton exchange membrane ("PEM") electrolyte 26, which is a corrosion rate of 0.25% per start up-shut down cycle. A heat-treated support for catalysts of the cathode catalyst layer 24 or a heat-treated cathode diffusion layer 40 is estimated to have a corrosion rate of between 0.0025% and 0.00025% per cycle, which results in between 25% and 2.5% corrosion loss in 10,000 cycles. Additionally, heat-treating both the carbon support material of the cathode catalyst layer 24 and the carbon black of the cathode diffusion layer 40, minimizes any interfacial flooding between the diffusion layer 40 and the cathode catalyst layer 24 that results from corrosion of either the cathode catalyst layer 24 or cathode diffusion layer 40.

The inventors herein measured corrosion rates of a carbon black as a function of heat-treat temperature. The carbon black tested is available under the trade name "VULCAN-XC72" from the Cabot Corporation Special Blacks Division of Billerica, Mass., U.S.A. The results of varying the heat-treat temperature on corrosion rate are summarized in TABLE 1.

TABLE 1

CORROSION RATE OF A CARBON BLACK
AFTER VARYING HEAT-TREAT TEMPERTURES

| HEAT-TREAT TEMPERATURE Degrees Centigrade | CORROSION RATE OF "VULCAN XC-72" CARBON BLACK mA/mg of carbon black at 100 min. and 1 Volt. |
|---|---|
| 0 | 0.18 |
| 600 | 0.15 |
| 1,000 | 0.14 |
| 1,300 | 0.085 |
| 1,500 | 0.025 |
| 1,700 | 0.018 |
| 2,000 | 0.0055 |
| 2,700 | 0.0027 |
| 3,000 | 0.0012 |

The measurements shown in TABLE 1 demonstrate that a carbon black heat-treated to 2,700 degrees centigrade ("°C.") has a corrosion rate that is over sixty times lower than the corrosion rate of the carbon black that is not heat-treated. Therefore, using a carbon support for the catalysts of the cathode catalyst layer 24 and/or for the carbon black within the cathode diffusion layer 40 reduces corrosion rates of those components at a given cathode potential by a factor of over 60. The measurements also indicate that a preferred heat-treated carbon support material or carbon black within the cathode diffusion layer must be heat-treated to a temperature greater than 2,000° C. in order to achieve significant corrosion resistance.

A further preferred embodiment of the fuel cell 20 having a corrosion resistant and protected cathode catalyst layer 24 includes an anode catalyst layer 22 having a poor oxygen reduction catalyst, wherein the poor oxygen reduction catalyst has a greater oxygen reduction over potential than platinum. The oxygen reduction catalyst utilized in the anode catalyst layer 22 is catalytic for hydrogen oxidation but is not as active for oxygen reduction as platinum. By inhibiting oxygen reduction on an anode catalyst layer or if oxygen reduction occurs at high over potential, for example on the anode catalyst layer 14 in "Region B" shown in FIG. 1, then the opposed cathode catalyst layer 12 within "Region B" cannot be brought to as detrimentally high a potential as if the catalyst was platinum. Therefore, inclusion of a poor oxygen reduction catalyst on the anode catalyst layer 22 will further enhance the corrosion resistance of the cathode catalyst layer 24 of the preferred fuel cell 20.

Appropriate poor oxygen reduction catalysts for application to the anode catalyst layer 22 may be in the form of a metal black or may be supported on a suitable support material known in the fuel cell art such as carbon black. The poor oxygen reduction catalysts appropriate for use in the anode catalyst layer 22 may be a pure material, an alloy of two or more materials, or an admixture of two or more materials. The poor oxygen reduction catalysts utilized on the anode catalyst layer 22 may be selected from the group consisting of iridium, rhodium, palladium, rhenium, ruthenium, gold, silver, nickel, alloys of these materials with another member or members of the group or with platinum, and mixtures thereof. These poor oxygen reduction catalysts utilized on the anode catalyst layer 22 have metallic, catalytic surfaces in hydrogen, but will be coated with an oxide, and hence have less catalytically active surfaces in the presence of oxygen. Therefore, upon start up of the fuel cell 20, less oxygen reduction will occur on the identified poor oxygen reduction catalysts in the anode catalyst layer 22 until the catalysts are in contact with hydrogen, which will reduce the oxide back to metal. These metals are also known to have oxygen reduction activities at least two orders of magnitude lower than platinum. The poor oxygen reduction catalysts on the anode catalyst layer 22 must have a solubility in acid low enough so that they do not lose material through dissolution or electrochemical migration. The noble metals palladium, iridium and rhodium are preferred because of their favorable low solubility in the acidic conditions of a PEM fuel cell. Additionally, non-platinum alloys are preferred as poor oxygen reduction catalysts on the anode catalyst layer 22 in order to enhance hydrogen oxidation without significant limitation of the desired inhibition of oxygen reduction on the anode catalyst layer 22.

The fuel cell 20 having a corrosion resistant and protected cathode catalyst layer 24 of the present invention minimizes corrosion of the cathode catalyst layer 24, and therefore significantly improves performance and extends a life span of the fuel cell 20 in any of the described embodiments or combinations thereof. The described embodiments include a cathode catalyst layer 24 having a platinum oxygen reduction catalyst and an oxygen evolution catalyst more active than platinum for oxygen evolution; non-uniform application of the oxygen evolution catalyst to identified high corrosion areas of the cathode catalyst layer 24; the cathode catalyst layer 24 and/or carbon black within the cathode diffusion support layer 40 including carbon heat-treated above 2,000° C.; and, the anode catalyst layer 22 including a poor oxygen reduction catalyst having a greater oxygen reduction over potential than platinum.

While the present invention has been disclosed with respect to the described and illustrated embodiments, it is to be understood that the invention is not to be limited to those embodiments. For example, while the preferred embodiments have been described with respect to a fuel cell 20 having a PEM electrolyte, the fuel cell 20 having a corrosion resistant and protected cathode catalyst layer 24 may employ alternative electrolytes known in the art. Additionally, the porous anode water transport plate 32 and/or the porous cathode water transport plate 44 may be replaced by solid, bi-polar plates known in the art. Accordingly, reference should be made primarily to the following claims rather than the foregoing description to determine the scope of the invention.

What is claimed is:

1. A fuel cell (20) having a corrosion resistant and protected cathode catalyst layer (24), the fuel cell (20) comprising:
   a. an anode catalyst layer (22) and a cathode catalyst layer (24) secured to opposed surfaces of an electrolyte (26);
   b. wherein the cathode catalyst layer (24) includes a platinum oxygen reduction catalyst and an oxygen evolution catalyst selected from the group consisting of catalysts that are more active than platinum for oxygen evolution.

2. The fuel cell (20) having a corrosion resistant and protected cathode catalyst layer (24) of claim 1, wherein the oxygen evolution catalyst is selected from the group consisting of iridium, rhodium, ruthenium, ruthenium oxide, compounds of ruthenium and titanium oxide, ruthenium and tantalum oxide, ternary compounds of ruthenium, iridium and tantalum oxide, alloys of those materials with platinum, and mixtures thereof.

3. The fuel cell (20) having a corrosion resistant and protected cathode catalyst layer (24) of claim 1, wherein the platinum oxygen reduction catalyst is between 4 wt. % and 40 wt. %, and the oxygen evolution catalyst is between 1 wt. % and 10 wt. % with respect to the catalysts and a carbon support material supporting the catalysts.

4. The fuel cell (20) having a corrosion resistant and protected cathode catalyst layer (24) of claim 1, wherein the cathode catalyst layer (24) defines a reactive surface (62), the platinum oxygen reduction catalyst is uniformly applied across the reactive surface (62), and the oxygen evolution catalyst is non-uniformly applied across the reactive surface (62) of the cathode catalyst layer (24).

5. The fuel cell (20) having a corrosion resistant and protected cathode catalyst layer (24) of claim 4, wherein the oxygen evolution catalyst is non-uniformly applied across the reactive surface (62) so that the oxygen evolution catalyst is secured to identified high corrosion areas (82) (84) of the reactive surface (62) of the cathode catalyst layer (24).

6. The fuel cell (20) having a corrosion resistant and protected cathode catalyst layer (24) of claim 4, wherein the oxygen evolution catalyst is non-uniformly applied on the reactive surface (62) so that the oxygen evolution catalyst is secured to identified high corrosion areas (82) (84) of the reactive surface (62) of the cathode catalyst layer (24) at a greater quantity than the oxygen evolution catalyst is applied to non-high corrosion areas of the reactive surface (62) of the cathode catalyst layer (24).

7. The fuel cell (20) having a corrosion resistant and protected cathode catalyst layer (24) of claim 1, wherein the cathode catalyst layer (24) includes a heat-treated carbon support, the carbon support being heat-treated to a temperature at least as high as 2,000° C.

8. The fuel cell (20) having a corrosion resistant and protected cathode catalyst layer (24) of claim 1, wherein the fuel cell (20) includes a cathode catalyst layer support means for supporting the cathode catalyst layer and for permitting fluid flow through the support means, the support means comprising a heat-treated carbon black forming a cathode diffusion layer (40), the carbon black of the cathode diffusion layer (40) being heat-treated to a temperature at least as high as 2,000° C.

9. The fuel cell (20) having a corrosion resistant and protected cathode catalyst layer (24) of claim 1, wherein the fuel cell (20) includes an anode catalyst layer (22) having a poor oxygen reduction catalyst, the poor oxygen reduction catalyst being selected from the group consisting of catalysts having a greater oxygen reduction over potential than platinum.

10. The fuel cell (20) having a corrosion resistant and protected cathode catalyst layer (24) of claim 9, wherein the poor oxygen reduction catalyst is selected from the group consisting of iridium, rhodium, palladium, rhenium, ruthenium, gold, silver, nickel, alloys of these materials with another member or members of the group or with platinum, and mixtures thereof.

11. The fuel cell (20) having a corrosion resistant and protected cathode catalyst layer (24) of claim 1 wherein the electrolyte (26) is a proton exchange membrane electrolyte.

12. A fuel cell (20) having a corrosion resistant and protected cathode catalyst layer (24), the fuel cell (20) comprising:
   a. an anode catalyst layer (22) and a cathode catalyst layer (24) secured to opposed surfaces of an electrolyte (26);
   b. wherein the anode catalyst layer (22) includes a poor oxygen reduction catalyst, the poor oxygen reduction catalyst being selected from the group consisting of catalysts having a greater oxygen reduction over potential than platinum.

13. The fuel cell (20) having a corrosion resistant and protected cathode catalyst layer (24) of claim 12, wherein the poor oxygen reduction catalyst is selected from the group consisting of iridium, rhodium, palladium, rhenium, ruthenium, gold, silver, nickel, alloys of these materials with another member or members of the group or with platinum, and mixtures thereof.

14. A fuel cell (20) having a corrosion resistant and protected cathode catalyst layer (24), the fuel cell (20) comprising:
   a. an anode catalyst layer (22) and a cathode catalyst layer (24) secured to opposed surfaces of a proton exchange membrane electrolyte (26); and,
   b. wherein the cathode catalyst layer (24) includes a heat-treated carbon support, the carbon support being heat-treated to a temperature at least as high as 2,000° C.

15. The fuel cell (20) having a corrosion resistant and protected cathode catalyst layer (24) of claim 14, wherein the fuel cell (20) includes a cathode catalyst layer support means for supporting the cathode catalyst layer and for permitting fluid flow through the support means, the support means comprising a heat-treated carbon black forming a cathode diffusion layer (40), the carbon black of the cathode diffusion layer (40) being heat-treated to a temperature at least as high as 2,000° C.

16. A fuel cell (20) having a corrosion resistant and protected cathode catalyst layer (24), the fuel cell (20) comprising:
   a. an anode catalyst layer (22) and a cathode catalyst layer (24) secured to opposed surfaces of an electrolyte (26);
   b. wherein the cathode catalyst layer (24) includes a platinum oxygen reduction catalyst and an oxygen evolution catalyst selected from the group consisting of catalysts that are more active than platinum for oxygen evolution;
   c. wherein the cathode catalyst layer (24) defines a reactive surface (62), the platinum oxygen reduction catalyst is uniformly applied across the reactive surface (62), and the oxygen evolution catalyst is non-uniformly applied across the reactive surface (62) of the cathode catalyst layer (24);
   d. wherein the cathode catalyst layer (24) includes a heat-treated carbon support, the carbon support being heat-treated to a temperature at least as high as 2,000° C.; and, e. wherein the anode catalyst layer (22) includes a poor oxygen reduction catalyst, the poor oxygen reduction catalyst being selected from the group consisting of catalysts having a greater oxygen reduction over potential than platinum.

17. The The fuel cell (20) having a corrosion resistant and protected cathode catalyst layer (24) of claim 16, wherein the oxygen evolution catalyst is non-uniformly applied across the reactive surface (62) so that the oxygen evolution catalyst is secured to identified high corrosion areas (82) (84) of the reactive surface (62) of the cathode catalyst layer (24).

18. The fuel cell (20) having a corrosion resistant and protected cathode catalyst layer (24) of claim 16 wherein the oxygen evolution catalyst is non-uniformly applied on the reactive surface (62) so that the oxygen evolution catalyst is secured to identified high corrosion areas (82) (84) of the reactive surface (62) of the cathode catalyst layer (24) at a greater quantity than the oxygen evolution catalyst is applied to non-high corrosion areas of the reactive surface (62) of the cathode catalyst layer (24).

19. The fuel cell (20) having a corrosion resistant and protected cathode catalyst layer (24) of claim 16, wherein the fuel cell (20) includes a cathode catalyst layer support means for supporting the cathode catalyst layer and for permitting fluid flow through the support means, the support means comprising a heat-treated carbon black forming a cathode diffusion layer (40), the carbon black of the cathode diffusion layer (40) being heat-treated to a temperature at least as high as 2,000° C.

20. The fuel cell (20) having a corrosion resistant and protected cathode catalyst layer (24) of claim 16, wherein the poor oxygen reduction catalyst included in the anode catalyst layer is selected from the group consisting of iridium, rhodium, palladium, rhenium, ruthenium, gold, silver, nickel, alloys of these materials with another member or members of the group or with platinum, and mixtures thereof.

* * * * *